United States Patent [19]
Terraillon

[11] 3,961,676
[45] June 8, 1976

[54] WEIGHING SCALES
[75] Inventor: Marc Terraillon, Gaillard, France
[73] Assignee: Terraillon, Annemasse, France
[22] Filed: May 9, 1975
[21] Appl. No.: 576,300

[30] Foreign Application Priority Data
May 24, 1974 Switzerland............... 7196/74

[52] U.S. Cl.................................. 177/178; 353/40
[51] Int. Cl.² ..................................... G01G 23/32
[58] Field of Search ............. 177/178, 177; 353/40, 353/41

[56] References Cited
UNITED STATES PATENTS
| | | | |
|---|---|---|---|
| 2,364,837 | 12/1944 | Williams | 177/178 |
| 3,512,594 | 5/1970 | Grusin et al. | 177/178 |
| 3,547,212 | 12/1970 | Grusin | 177/178 |

*Primary Examiner*—Joseph W. Hartary
*Attorney, Agent, or Firm*—Pennie & Edmonds

[57] ABSTRACT

A weighing scales has a base and a platform supported by the base and adapted to support an individual. A transmission mechanism within the base is responsive to movement of the platform for causing pivotal translation of a graduated transparency. A beam of light from a light source is projected along an optical path through the transparency and reflected to a projection screen carried by the platform for read-out of weight. The light source is carried on a support plate which is mounted to the base by means disposed at two points on a line at least substantially parallel to the optical axis and coincident with the optical axis substantially at a fixed axis of the graduated transparency. The transparency is pivotally mounted on the support plate and presents a convex face toward the light source.

7 Claims, 3 Drawing Figures

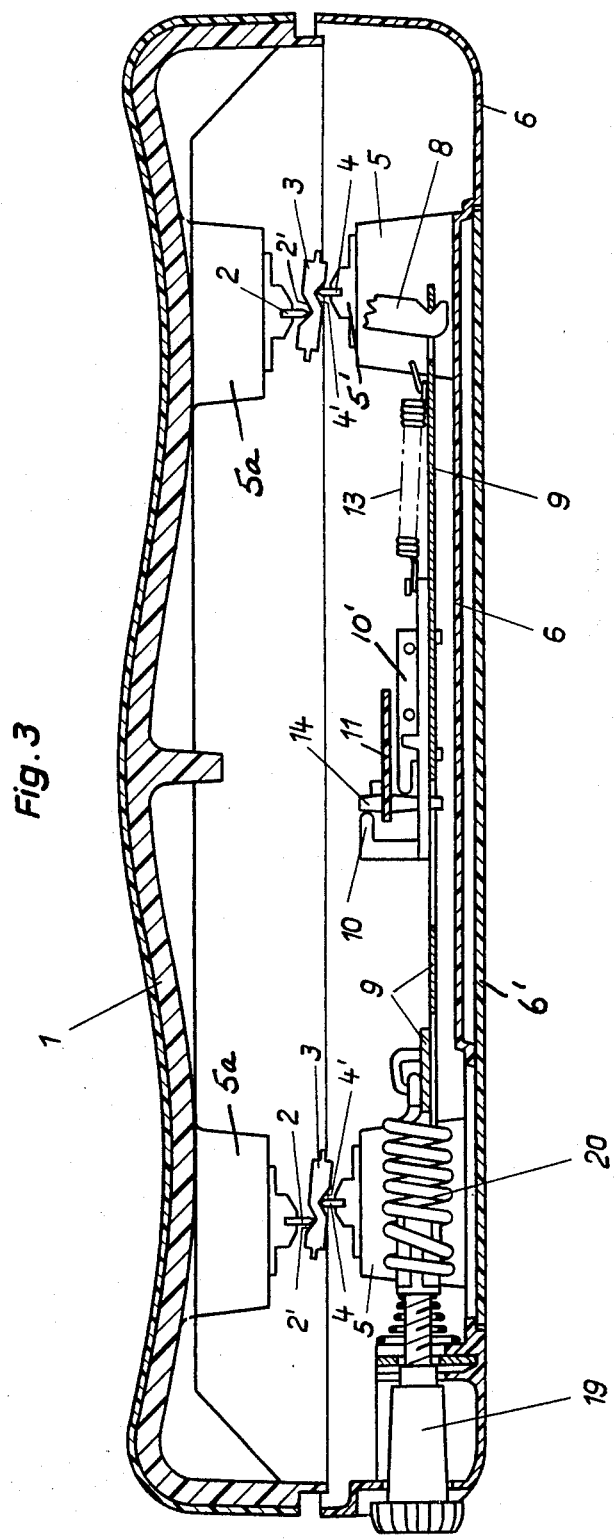

WEIGHING SCALES

BACKGROUND OF THE INVENTION

Weighing scales including a platform upon which an individual may stand and a base for housing structure both to support and translate movement of the platform relative to the base to movement of a graduated scale to be read are known. It is also known that the weighing scales may include an optical system whereby light from a source is passed through the graduated scale so that the image of indicium from the graduated scale is reflected by one or more mirrors to a projection screen carried by the platform. The image on the screen is representative of the weight of the individual. A form of the prior art weighing scales of this type may be seen in Grusin et al. U.S. Reissue Pat. No. 28,040, dated June 11, 1974.

While this form of prior art weighing scales overcomes what has been considered to be one of the principal objections to the weighing scales without the foregoing optical system, namely, the difficulty in read-out of weight, either because of the size or legibility of the indicia or inadequate lighting of the indicia, the prior art has the disadvantage that frequently inaccuracy is introduced to the read-out of weight because of deformation of the base structure upon which the source of light and the graduated scale are independently supported relative to the base. This problem becomes more prevalent through the mass production of weighing scales required to meet commercial demands and, although the deformation may be small, the magnification of the indicia of weight by the optical system can lead to non-negligeable errors in the read-out at the projection screen.

BRIEF DESCRIPTION OF THE INVENTION

The present invention seeks to overcome the above disadvantage in the prior art and the weighing scales according to the invention is distinguished therefrom by the fact that it comprises a support plate upon which both the light source is fixed and the graduated scale is pivotally mounted for movement, as will be described. The support plate is fixed to the base at a plurality of points included within a plane which is at least substantially parallel to and in closely spaced proximity to the optical axis of the beam of light for the light source serving to project the indicia of the graduated scale toward a projection screen. Further, the plane and the optical axis are coincident at the pivotal axis of the graduated scale.

By this construction, it is possible substantially to eliminate error resulting from the deformation in the base which otherwise may cause a relative angular displacement of the graduated scale and the light source about the axis of the graduated scale. Possible deformation in the base transmitted to the support plate is overcome by relocating both the optical axis and the axis of the graduated scale without relocation of their relative disposition, one to the other. Thus, precision in read-out is not lost.

DESCRIPTION OF THE DRAWINGS

FIG. 3 is a view similar to FIG. 2 as seen along the line 3—3 in FIG. 1.

DETAILED DESCRIPTION OF THE PREFERRED EMBODIMENT

The scales of the present invention is of the type commonly referred to as a bathroom scales and provides mechanical system components which respond to the weight of an individual on a movable platform for movement of a graduated scale and optical system components which function to project an indicium representative of the weight of an individual on a projection screen carried by the platform.

The scales comprises a base 6 and a platform 1. Both the base and platform are formed of a material which displays structural characteristics, among others, of strength, durability, and rigidity thereby to permit the scales to withstand and respond to the weight of an individual on the platform, as described. The material, also, should display aesthetic characteristics, such as luster. While the base and platform preferably are formed of one of the commonly employed synthetic plastic materials they likewise may be formed of metal or other material capable of being molded or otherwise formed to the outline as may be seen in the Figures. Thus, the base and platform both may be round in plan view. The platform, further, provides an upper contoured surface and a depending skirt integral therewith; whereas, the base provides a lower surface which surrounds a central area and which connects the central area with an upstanding wall also integral therewith and concentric with the skirt. The upstanding wall and lower surface of the base together with the skirt and upper surface of the platform define the housing of the scales.

The inner surface of both the base and the platform are suitably ribbed to increase strength characteristics of the plastic.

The central area of the base is recessed somewhat within the housing. The central area is irregularly formed for purposes of mounting various components of the mechanical and optical systems, to be described below. A cover plate 6' is received by the base in the plane of the lower surface to complete the housing enclosure. The cover plate may include a plurality of supporting feet (not shown) and provides a plurality of access openings for purposes as will become clear.

The skirt of platform 1 is provided with an outer annular cutout whose length measured from the rim of the skirt determines substantially the limit of axial movement of the platform relative to the base.

Figure 1:
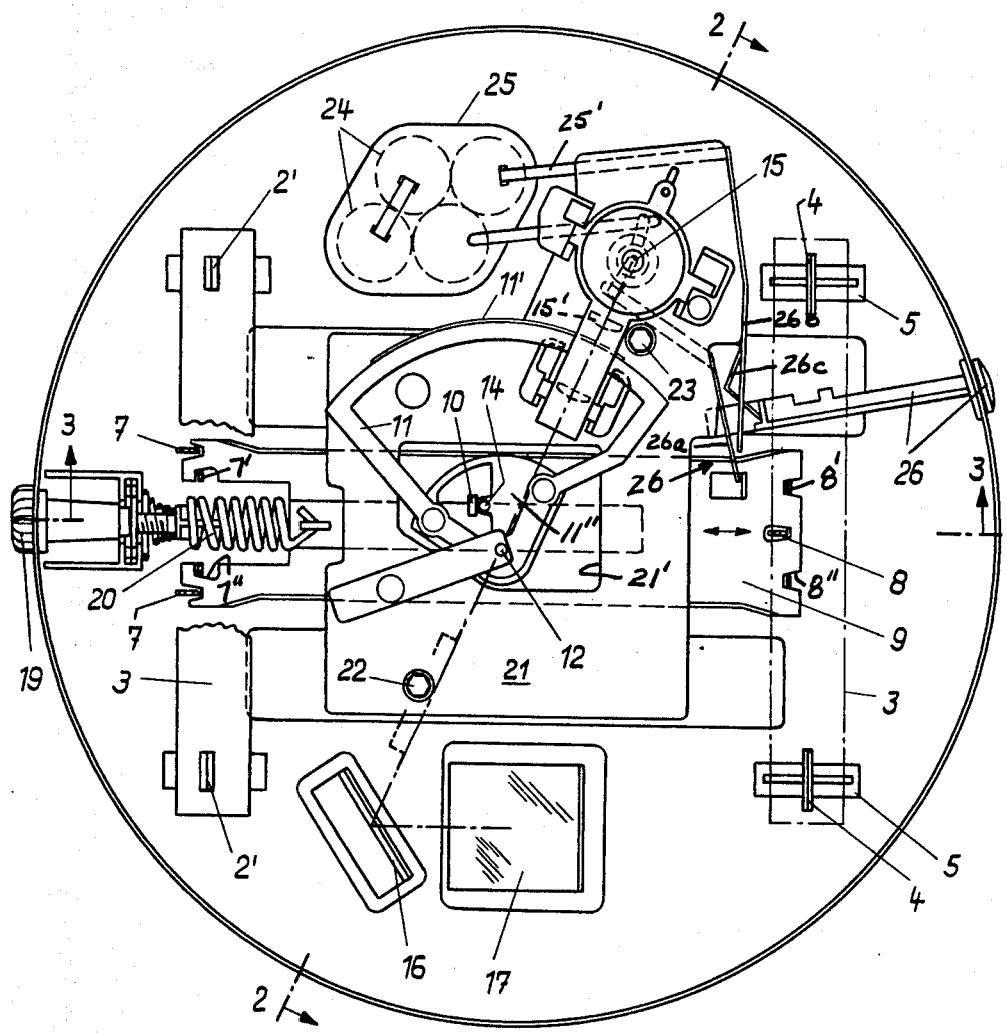
FIG. 1 is a top plan view of the scales of the present invention, the platform first having been removed for purposes of illustration of the structure thereunder.

A lustrous coating layer may be adhered or otherwise applied to the platform 1, as illustrated in FIG. 1, for enhancement of appearance of the scales. The base 6 may be formed of the same material as the coating layer.

The structure for mounting the platform 1 on base 6 and the mechanical components for translating axial movement of the platform relative to the base to rotary movement of a graduated scale may be seen to best advantage in FIGS. 1 and 3.

Referring now to FIGS. 1 and 3, the central ribbed area of the base 6 is formed to provide a plurality of projections or pedestals 5 which extend upwardly toward the platform 1. The pedestals extend perpendicular to the plane of the platform and, preferably, are arranged in a rectangular array with each pair of alternate pedestals located on a diagonal whose intersection with the diagonal between the other pair of pedestals is within the plane including the optical axis and the fixed axis 12 of the graduated scale carried on sector-shaped member 11. The point of intersection is slightly removed from the fixed axis 12 toward a light source 15.

Each pedestal 5 carries an element 5' which, in turn, supports a knife edge member 4. A like plurality of projections or pedestals 5a are supported by rib structure 1' on the underside of platform 1 and extend downwardly toward the base 6. These pedestals 5a, similarly extend perpendicular to the plane of the platform and are disposed in an array to cooperate with each pedestal 5. Each pedestal 5a likewise carries an element 5a' which supports a knife edge member 2. The two pairs of knife edge members 2, 4 on opposite sides of fixed axis 12 are disposed along parallel chords which are laterally spaced apart. For stability of the platform 1 on the base 6 the plane of the chord including the knife edges 4 are disposed substantially equidistantly from the point of intersection of the diagonals from the pairs of alternate pedestals 5.

A pair of bars 3 of relatively flat upper and lower contour and of a length at least to span the space between cooperating pedestals serve to support the platform 1 on the base 6. To this end, each bar provides adjacent its ends and offset across the width an upper and lower V-shaped recess 2' and 4' for receipt therein of the knife edges 2 and 4, respectively. Each bar carries at least one lever arm which extends toward the base 6. To this end, the bar to the left of the fixed axis (direction taken from FIG. 1) supports a pair of lever arms 7 located between and substantially equidistantly spaced from one pair of pedestals 5, while the bar to the right of the fixed axis supports a single lever arm 8 which is substantially equidistantly spaced between the other pair of pedestals 5. Each lever arm provides a V-shaped notch adjacent the end away from the bar, each notch being concave toward the right, as seen in FIG. 3. Each lever arm is fixedly carried by its respective bar to move with the bar.

The bars 3 and lever arms 7, 8 form a part of a conventional multiplying mechanism which translates a change in axial displacement of the platform 1 relative to the base 6 in response to the weight of an individual on the platform to a displacement of a slide 9 located below the platform horizontally to the right in FIG. 3. Displacement of the slide is in opposition to the bias of spring 20 from a position of rest.

Slide 9 is formed by a generally flat, elongated rectangular plate. The plate includes a cutout for receipt of the lever arm 8 and a pair of notches into which the lever arms 7 are received. Each of the notches and cutout in the plate provide a knife edge (not shown) for cooperation in the V-shaped notch formed in the respective lever arms 7, 8. When the platform 1 is subjected to the weight of an individual and translates downwardly, the bars 3 pivot counterclockwise about the knife edge members 4 thereby through cooperation of the lever arms 7, 8 and slide 9 to cause the slide to displace horizontally, as described. When the platform no longer is subjected to the weight the tension of spring 20 draws the slide toward the position of rest. Simultaneously, lever arms 7, 8 and bars 3 pivot clockwise about the knife edge members 4. The result is that the platform 1 moves upward.

A pair of arm elements 7', 8', also may be carried by the bars 3 and depend toward the slide 9. The arm elements cooperate in the notches 7'', 8'' of slide 9, respectively, and each arm element includes a foot portion for receipt under the surface of the plate. The arm elements act both to provide stabilization of the bars 3 and slide 9 and to support the slide above the surface of a channel formed along the central area of the base 6.

The mechanical system includes, further, the sector-shaped member 11 which is mounted for pivotal movement about the fixed axis 12. The sector-shaped member 11 includes a pair of arms which diverge generally radially outwardly from their junction, the arms being connected at the other end by an arcuate segment having a length of less than 90°. A stub shaft extends downwardly of the sector-shaped member 11 substantially at the junction of the intersection of its arms. A smaller sector-shaped member 11'' is disposed below the sector-shaped member 11 and supported by the stub shaft and arms. The sector-shaped member 11'' provides a projection 14 whose axis substantially is parallel to the axis of the stub shaft.

The graduated scale is carried on a transparency 11', in the form of a film forming portion on a cylinder. The transparency may be removably supported on the arcuate segment of sector-shaped member 11 by any convenient means in position so that the graduations of the scale may move through the optical axis.

The transparency carries graduations representative of the weight of an individual in a convenient scale, throughout an arcuate length of about 45°. The transparency, further, is mounted independent of the mounting of the sector-shaped member 11. A typical manner of mounting may be to secure the transparency between a spring (not shown) and a flat face of the arcuate segment. The spring, in turn, may be connected between a pair of spaced projections (not shown) extending from the flat face.

The plate 21 is mounted by the rib structure within the central area of the base 6. The plate resides above the slide 9 and includes a cutout 21' above the region of the channel along which the slide 9 moves. The plate also includes a circular aperture defining the fixed axis 12. The stub shaft is received in the aperture to provide a pivot for the sector-shaped member 11.

An abutment member 10' is fixedly carried by the slide 9. The abutment member 10' is spaced from an upstanding edge along substantially the length of the slide by a distance to provide a channel for movement of an element carrying a pin 10. The pin extends from the element toward the platform 1 and includes a projection substantially normal thereto. The element is retained in the channel formed by the abutment member and through action of spring 13, the projection on pin 10 is biased into engagement with projecton 14 on the sector-shaped member 11''. The spring is secured between the element and an ear struck from the slide 9. Thus, as the slide 9 translates to the right under the weight of an individual on platform 1 the projection on pin 10, in engagement with the projection 14, pivots the sector-shaped member 11 about the fixed axis 12. The spring 13 assures engagement of the projections over a full path of movement of the sector-shaped member to obviate substantially any lost motion which shall introduce error.

The abutment member 10' provides a pin (not shown) which engages with the opposite side of the projection 14. In this manner when the individual shall have stepped from the platform 1, the sector-shaped member 11 will pivot in the opposite direction under the influence of spring 20 as slide 9 returns to the position of rest.

A housing 25 enclosing the light source 15 and a pair of lenses 15' is supported by the plate 21. Preferably, the light source is disposed at a position radially outwardly of the transparency 11' to increase the length of the optical path. As illustrated in FIG. 1, the lenses 15' are located on opposite sides of the transparency 11'. The first of the lenses causes the beam of light from source 15 to travel in a parallel path toward the transparency while the second of the lenses thereafter directs the illuminated image of indicium to a mirror 16. The mirror 16 is disposed on the opposite side of fixed axis 12 and comprises the first of a pair of mirrors for reflecting the illuminated image on a projection screen 18. To this end, the mirror 16 is disposed vertically and at an angle other than 90° to the optical axis which is generally along the section line 2—2 in FIG. 1. The illuminated image of the indicium is reflected to a second mirror 17 located at an angle of approximately 45° measured from the plane of the projection screen 18. While the light source 15 and the fixed axis 12 are supported by plate 21 to reside at constant spacing, and the optical axis intersects the fixed axis, the mirrors 16 and 17 are fixed to a support carried by base 6. The fixed relationship of the fixed axis 12 and light source 15 improves the quality of transmission of the image of indicium and facilitates measuring.

The projection screen 18 is supported on a shoulder formed in the platform 1 and secured in position by the coating layer which is received thereover. To this end, the projection screen may include an upper translucent window surface and an annular offset base surface. The base surface is supported by the shoulder and the upper surface is received through an opening in the coating layer to be flush with the contour.

The light source, for example, may be formed by an electric lamp A power source in the form of a battery including a plurality of individual cells 24 is carried in the housing 25 for supplying current to the electric lamp. As indicated, the cover 6' includes a plurality of access openings, one of which permits replacement of the batteries, the other of which permits replacement of the electric lamp, as necessary. The cells 24 are arranged in series by suitable electrical connection within the housing and on a door (not shown) mounted by cover 6' to close the access opening. A plurality of conductive straps 25' electrically connect the cells to the electric lamp.

Figure 2:
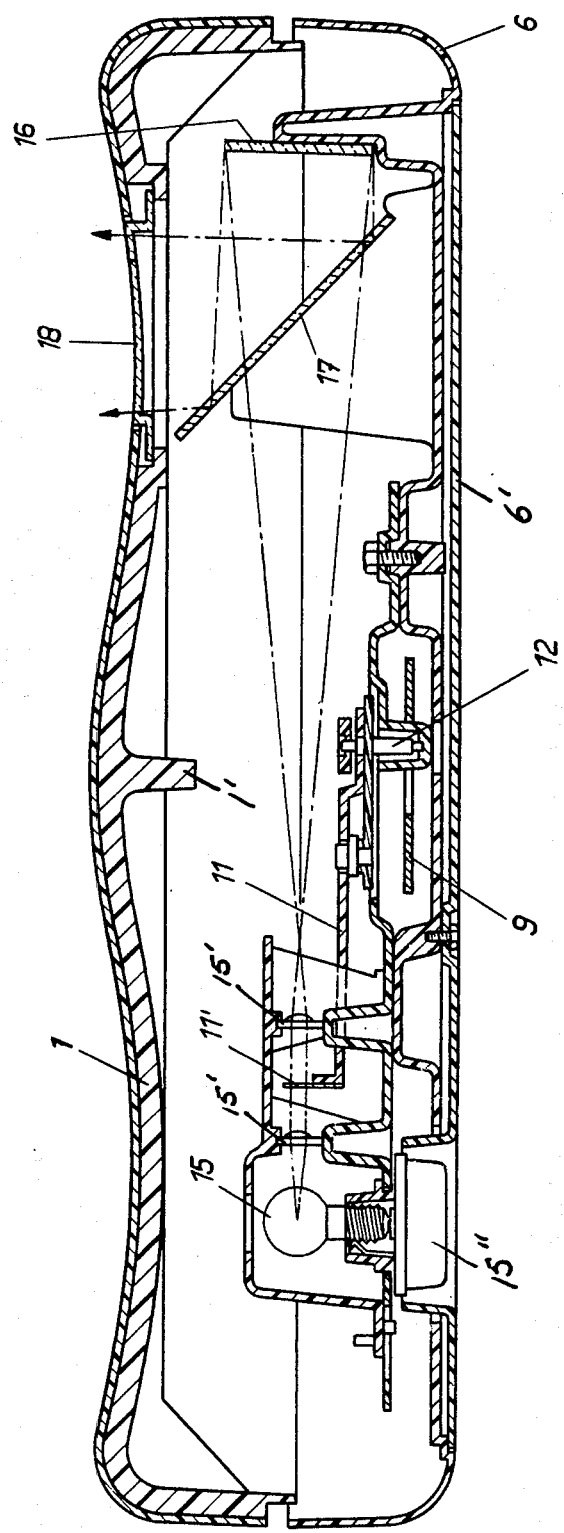
FIG. 2 is an enlarged vertical section as seen along the line 2—2 in FIG. 1, the platform having been repositioned over the base.

The projection path may be seen in FIG. 2, and as indicated this path coincides with section line 2—2 between the electric lamp and mirror 16. The image of indicium projected and reflected to the projection screen 18 is magnified many times. The magnified image of indicium may be read in relation to an index (not shown) disposed at the edge of the projection screen 18. The magnification factor (which may be in excess, for example, of eighteen times) permits that the scale graduations on the transparency be relatively small in size and extend only within the aforementioned arcuate length for full scale reading. A significant advantage is greater precision of operation. And, as a further advantage of the samll angular displacement of scale graduation for full scale reading, it is possible to drive the sector-shaped member 11 by the projection on pin 10 acting upon the projection 14. This is a rather uncomplex and rather inexpensive drive when considering the conventional rack and pinion drive of the prior art.

The housing 15, mounted on plate 21, is capable of undergoing slight adjustment along the optical axis for positioning of the lenses 15' relative to the transparency 11'. This will enable focusing of the indicium on the projection screen. To this end, the lenses are fixed to the housing. The light source, mounted by a plug 15'' received by plate 21, as described, is fixed relative to the fixed axis 12. The housing includes an opening toward the fixed axis 12 and a slot through which the transparency moves.

As noted in FIG. 2 the plug 15'' is received through to close the other access opening in cover plate 6', and supported by plate 21 in conventional manner.

The plate 21 is fixed to base 6 by a plurality of screws 22, 23, one of which is disposed on one side of the optical axis and the other of which is disposed on the other side of the optical axis. Both screws are spaced a small distance normal to the optical axis so that a straight line between the mounting screws relative to the optical axis is substantially parallel to the optical axis and intersects the optical axis at the fixed axis 12 of sector-shaped member 11. The manner of mounting of the plate 21 has the effect of turning the optical axis and the transparency 11' about the optical axis of the transparency and the light source about the axis 12. The mounting thereby will eliminate any error resulting from an angular displacement produced by deformation in the base 6.

A switch 26' including a pair of relatively movable contact arms 26a, 26b is connected to the conductive straps 25' from the cells. The contact arms normally are biased apart to maintain the circuit including the light source and cells open. The switch is operable automatically when an individual stands on the platform 1 and may be operated at other times for purposes of zero setting of the scales. To these ends, the contact arm 26a is controlled by an ear on slide 9 and movable toward the contact arm 26b as the slide 9 is actuated to the right. For zero setting of the scales, a contact arm portion 26c struck from contact arm 26b is movable toward contact arm 26a, again to close the circuit to the light source. Movement of the contact arm 26c is controlled by an elongated member 26 having a button at one end and a tab at the other end. The elongated member is movable back and forth along a prescribed longitudinal path and biased toward the upstanding wall of the base 6 by engagement of the tab and contact arm 26c. The button is readily accessible and movable within an aperture in the wall in the other direction. When the transparency is illuminated the tension on spring 20, as conventional, may be adjusted thereby to cause sector-shaped member 11 to pivot about the fixed axis 12 through engagement of the projection on pin 10 and projection 14. As apparent, rotation of adjustment button 19 is continued until the numeral "0" is located at the index of projection screen 18.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. A weighing scales comprising a base and a platform adapted to receive a person to be weighed, means carried by said base both for supporting said platform and for translating movement of said platform relative to said base to movement of a graduated scale formed by a transparency carrying weight indicia, and an optical system including a light source for projecting a beam of light through said graduations of said transparency, a plurality of mirrors for reflecting an illuminated image of weight indicium, and a translucent window provided with an index carried by said platform, said weighing scales characterized in that it further comprises a support plate, said support plate mounting said light source and said transparency in fixed spaced relation thereto, said support plate being fixed to said base at points within a plane aligned along a straight line which is at least substantially parallel and in proximity to the optical axis of the beam of light from said light source serving to project the graduations onto said translucent window.

2. The weighing scales according to claim 1 in which said transparency is in the form of a portion of a cylinder mounted on a sector-shaped member, said sector-shaped member being pivotally mounted on an axis, said last-named axis and said optical axis as well as said straight line intersecting one another at a common point.

3. The weighing scales according to claim 1, in which said light source is an electric lamp, and comprising auxiliary switch means for switching on said light source independently of movement of said platform.

4. The weighing scales according to claim 2, in which said light source is disposed on the convex side of said transparency.

5. The weighing scales according to claim 2, in which the graduations on said transparency extend throughout an arc of less than 90°.

6. The weighing scales according to claim 5, wherein said translating means includes a pin acting against said sector-shaped member to pivot said sector-shaped member about said axis.

7. The weighing scales according to claim 1, in which said mirrors are supported by said base.

* * * * *